United States Patent Office 2,923,706
Patented Feb. 2, 1960

2,923,706

MANUFACTURE OF CELLULOSE ESTERS OF ALIPHATIC ACIDS

Norman B. Campbell, Drummondville, Quebec, and Laurent Berthiaume, Marcotte Village, Quebec, Canada, assignors to Canadian Celanese Limited, Montreal, Quebec, Canada, a body politic and corporate No Drawing. Application June 22, 1955
Serial No. 517,372

6 Claims. (Cl. 260—229)

This invention relates to the manufacture of cellulose esters of aliphatic acids, especially esters of lower aliphatic acids (i.e. aliphatic acids containing 2–4 carbon atoms in the molecule) such as cellulose acetate by a process of the solution type in which a lower aliphatic acid, e.g. acetic acid, is used to dissolve the cellulose ester as it is formed and sulphuric acid is used as catalyst.

When cellulose acetate, for example, is made by processes of this type, the ester as first obtained normally contains a proportion of sulphate groups which, unless substantially completely removed, render it unstable towards heat. If an acetone-soluble cellulose acetate is required, the cellulose acetate first formed (known as the primary cellulose acetate) is partly hydrolysed so as to split off a proportion of its acetyl groups and give it an acetyl value of say 52.5–56.5% reckoned as acetic acid. In this process, which is termed ripening, most or substantially all of the sulphate groups are also split off, so greatly increasing the stability of the cellulose acetate.

On the other hand, when it is desired to produce a cellulose triacetate (using the term in its usual connotation to include cellulose acetates of acetyl value of about 59–62.5%) and especially cellulose triacetate having an acetyl value closely approaching the maximum of 62.5%, e.g. between 61 and 62.5%, little or no hydrolysis of acetate groups is permissible, and thus the concomitant splitting off of sulphate groups does not take place, or at least not to the same extent. In consequence the production of a heat-stable cellulose triacetate of acetyl value approaching the maximum is a matter of greater difficulty.

One method by means of which the proportion of sulphate groups in cellulose acetate can be reduced is to employ only a small quantity of sulphuric acid as catalyst in the production of the cellulose acetate. It is found, however, that when acetic acid is used as the solvent in the acetylation, reduction of the amount of catalyst used tends to prevent a smooth gel-free solution being obtained. For this reason it is usual to employ quite a high proportion of sulphuric acid, for example about 10–16%. (Here and throughout this specification amounts of reagents and catalyst used in the esterification of cellulose are expressed in terms of the dry weight of the cellulose unless otherwise stated.)

It is an object of the present invention to provide a method of acetylating cellulose using acetic acid to dissolve the cellulose acetate formed and also a very small amount of sulphuric acid as catalyst, in which a clear substantially gel-free solution is obtained.

It is a further object of the invention to provide a method whereby a cellulose triacetate of good heat-stability can be obtained, especially a cellulose triacetate having an acetyl value well above 61% and even above 62% reckoned as acetic acid.

Other objects of the invention will appear hereinafter.

In the esterification of cellulose in accordance with the invention only a small amount of sulphuric acid is employed as catalyst, and the whole of this amount is uniformly distributed throughout the cellulose in the course of a pretreatment in which the main pretreatment agent is an aliphatic acid containing up to 4 carbon atoms in the molecule, especially acetic acid. It has been found that amounts of sulphuric acid below 1%, if introduced into the cellulose in this way, are capable of catalysing the esterification so effectively that smooth substantially gel-free solutions are readily obtained. At the same time, as a result of the small amount of sulphuric acid present, the esterification temperature can be allowed to rise above 50° or 60° C. without causing undue degradation of the cellulose molecule with consequent loss of viscosity. Indeed it is possible to use temperatures so high that the esterification can be completed in a matter of minutes, e.g. in 5–15 minutes without causing undue viscosity loss; this is of course a great advantage, since it enables esterification to be carried out as a continuous process.

In describing the invention in more detail it will be convenient to refer particularly to the production of cellulose triacetate. It will be understood, however, that the information given will apply also mutatis mutandis to the production of cellulose esters of other aliphatic acids, especially cellulose propionates, butyrates, acetate propionates and acetate butyrates in which the cellulose is substantially completely esterified in the sense of containing substantially less than 0.25, for instance less than 0.05 free hydroxyl groups for each anhydroglycose unit. It will be understood also that the cellulose triacetate or other ester first produced can if desired be ripened to modify its solvent properties, giving for example an acetone-soluble cellulose acetate.

The sulphuric acid is uniformly distributed throughout the cellulose in admixture with glacial or highly concentrated aqueous acetic acid as the main pretreatment acid. If desired, part of the acetic acid, but preferably not more than half, may be replaced by acetic anhydride. The acid mixture may be sprayed onto the cellulose, which is then preferably stirred or tumbled throughout the pretreatment, or the cellulose may be immersed in the acid mixture. These operations are preferably carried out at 25–40° C. The cellulose onto which the pretreatment acids have been sprayed or which is immersed in the acids is held for a time sufficient to allow uniform penetration of the pretreatment acids to all parts of the cellulose. Usually this penetration will be completed in an hour or less, though the pretreatment may be carried on for a longer time if desired.

The uniform penetration of the cellulose by the pretreatment acids may be facilitated and speeded up by first soaking the cellulose in an aqueous liquid, e.g. water or a dilute aqueous acetic acid, which may contain part of the sulphuric acid to be used in the pretreatment and acetylation. After such a treatment with an aqueous liquid the cellulose may if desired be squeezed, so as to remove part of the liquid before adding the pretreatment acids. Similarly when the cellulose has been soaked in the pretreatment acids it may be squeezed before the acetylation proper so as to reduce the amounts of acetic acid and sulphuric acid on the cellulose to the desired values.

The amount of sulphuric acid employed in the pretreatment and thus in the subsequent acetylation, including any remaining from a preliminary treatment with an aqueous liquid as described above, may be as low as 0.01% and is preferably between about 0.02% and 0.75% of the dry weight of the cellulose, amounts between about 0.02% and 0.5% being particularly useful.

It has been found that the viscosity of the cellulose triacetate obtained is directly dependent on the rate of acetylation, regardless of the combination of acetylation temperature and amount of sulphuric acid employed. The amount by which the temperature of the acetylation mixture rises depends of course on a number of factors including the amounts of acetic acid and anhydride present in relation to the amount of cellulose, the presence or absence of small amounts of water in the pretreated cellulose when it is brought into contact with the acetylation liquor, and the degree of cooling or heating, if any, employed during the acetylation, as well as the amount of sulphuric acid present; thus the viscosity of the product can be controlled for example by so choosing the initial temperature of the acetylation liquor that the temperature during the acetylation rises to the appropriate level.

The relatively high acetylation temperatures used in accordance with the invention have important advantages. One of these is that at these temperatures acetic acid dissolves cellulose triacetate more readily than at the temperatures usually employed, and also gives solutions having a lower viscosity at any particular concentration. As a result it is possible to use considerably less acetic acid than has heretofore been needed and still to obtain a smooth gel-free solution, thus effecting a considerable saving in the amount of acetic acid that has to be treated in the recovery plant. Indeed, the amount of liquid in the acetylation mixture may be so low that, before the acetylation begins, the mixture has the form of a wet fibrous mass of cellulose, as opposed to the usual suspension of cellulose in a body of acetylation liquor. Further, in spite of the higher concentration of the triacetate solutions then obtained, they may have much the same viscosity as, or even a lower viscosity than, the more dilute solutions formed in the known processes, so that acetylators of known type can be used without throwing any extra burden on the stirrers or the motors used to drive them.

Another advantage lies in the possibility of carrying out the acetylation at the boiling point of the acid while still obtaining a product of useful viscosity. This is a very simple and advantageous method of disposing of surplus heat, if any, produced in the acetylation and of keeping constant the acetylation temperature. The acetic acid vapor formed may be fed to a reflux condenser and after condensation returned to the acetylator, or if sufficient acetic acid is initially present part or all of that vaporised may be allowed to pass from the acetylator to a separate receiver and condenser, so again reducing the load on the acetic acid recovery plant. When it is desired to operate at the boiling point of the acetic acid it will generally be advisable to use as catalyst sulphuric acid of concentration not exceeding 0.1% so as to avoid excessive degradation. Neither precooling of the acetylation liquor, nor cooling of the acetylation mixture by heat exchange of the usual type, will generally be required; indeed if less than 0.1% of catalyst is used it will generally be necessary, initially, to supply heat to the acetylation mixture from an external source.

It is a particular advantage of the invention that the products are already highly stable, so that no separate stabilisation treatment is needed. Thus cellulose triacetate may be precipitated from the acetylation solution as soon as the acetylation is complete, for example by mixing in water or dilute acetic acid in the usual way. After being washed and dried, such a cellulose triacetate will normally have a combined sulphate content as low as, or even lower than 0.015%, and is ready, without further treatment, for use in the manufacture of fibres or films by known processes. If desired however, before it is precipitated the cellulose triacetate may be ripened, for example to acetone-solubility, in the solution, preferably at a temperature above about 100° C. and especially between about 100° and 150° C.

The invention is illustrated by the following examples, in which the "parts" given are parts by weight.

EXAMPLE I 15 parts of wood pulp were soaked for 1 hour at 25° C. in water containing sulphuric acid in concentration 0.023%, and the pulp was then first rinsed and afterwards soaked in 98% aqueous acetic acid containing sulphuric acid in concentration 0.023%. After about 1 hour the bulk of the liquid was run off and the pulp squeezed until it contained about 3 times its dry weight of liquid. This concluded the pretreatment. The pretreated pulp was then added to about 215 parts of a mixture of acetic anhydride and acetic acid containing 96% of anhydride, and the mixture was stirred until a clear solution had formed. The reaction conditions were varied so as to allow the temperature to rise to different levels in different runs. From the clear solution the triacetate was precipitated by mixing in dilute acetic acid in the known way, and the precipitate was washed and dried. Three typical runs gave the figures shown in Table I. In all cases the cellulose triacetate had a good heat stability, even though it was given no separate stabilisation treatment of any kind.

Table 1

| Maximum Acetylation Temperature | Acetylation Time (Minutes) | Intrinsic Viscosity of Cellulose Triacetate, dl./gm. |
| --- | --- | --- |
| 110° C | 5 | 1.5 |
| 80° C | 35 | 2.1 |
| 60° C | 345 | 2.6 |

The intrinsic viscosity was calculated on the basis of the relative viscosities of dilute solutions of cellulose triacetate (0.1 to 0.5%), in 90/10 (by volume) mixtures of methylene chloride and methanol, the intrinsic viscosity calculated using as the cellulose triacetate concentration units "grams of bone-dry triacetate per decilitre of solvent."

EXAMPLE II 50 parts of wood pulp were sprayed with 150 parts of glacial acetic acid containing 0.025 part of sulphuric acid (i.e. 0.05% on the weight of the cellulose) and tumbled for 2 hours at room temperature. The pretreated cellulose was then added to about 260 parts of a mixture of acetic anhydride and acetic acid containing 96% of acetic anhydride and the mixture was kept under a reflux condenser and stirred until it had formed a clear solution. The temperature reached 116° C. and the solution became clear after 30 minutes. The cellulose triacetate was then precipitated, washed and dried. It had an intrinsic viscosity of 1.4 dl./gm. and excellent heat stability.

EXAMPLE III

Three runs were made under the conditions of Example II except that the pretreatment liquid contained 0.25 part of sulphuric acid (i.e. 0.5% on the weight of the cellulose). The results of these runs are summarised in Table 2.

Table 2

| Maximum Acetylation Temperature | Acetylation Time (Minutes) | Intrinsic Viscosity of Cellulose Triacetate, dl./gm. |
| --- | --- | --- |
| 70 | 41 | 1.5 |
| 88 | 9 | 1.2 |
| 95 | 6 | 0.8 |

The heat stability of all the products was good.

EXAMPLE IV 50 parts of cotton were sprayed with 150 parts of glacial acetic acid containing either 0.1 or 0.25 part of sulphuric acid and tumbled for 1 hour at room temperature. The pretreated cotton was then added to about 260 parts of either 96% or 60% acetic anhydride (the remainder being acetic acid in both cases) and the mixture stirred until the solution had cleared, after which the cellulose triacetate was precipitated, washed and dried. The results are shown in Table 3.

Table 3

| Amount of Sulphuric Acid (Percent on Cellulose) | Acetic Anhydride Concentration (Percent) | Maximum Acetylation Temperature, ° C. | Acetylation Time (Minutes) |
|---|---|---|---|
| 0.5 | 96 | 76 | 29 |
| 0.2 | 96 | 106 | 27 |
| 0.5 | 60 | 81 | 35 |
| 0.2 | 60 | 105 | 23 |

In each case the heat stability of the product was good.

EXAMPLE V

Wood pulp (40 parts) was soaked for an hour in water at 25° C., rinsed once with glacial acetic acid, squeezed to about 4 times its original weight, introduced into 4 times its original weight of glacial acetic acid containing 0.04 part of sulphuric acid at 25° C., and after 1 hour squeezed to 4 times its original weight. The resulting pretreated pulp was added to a large volume of 96% acetic anhydride (the remainder being acetic acid) at 25° C., allowed to soak for 5 minutes and then squeezed to 4 times its original weight and allowed to stand. The temperature of the mass rose to 87° C., and after 240 minutes a clear solution had formed from which the cellulose triacetate produced was precipitated and the precipitate washed and dried. The intrinsic viscosity of the cellulose triacetate was 1.3 dl./gm. and its heat stability was very good.

We claim:

1. Process for the manufacture of lower aliphatic acid esters of cellulose, which comprises esterifying cellulose with an aliphatic acid anhydride containing from 2 to 4 carbon atoms in the molecule in the presence of at least sufficient aliphatic acid containing 2–4 carbon atoms in the molecule to dissolve the cellulose ester as it is formed, and of sulphuric acid in amount at most 1% as catalyst, the whole of the said sulphuric acid having been uniformly dispersed throughout the cellulose in the course of an activating pretreatment in which an aliphatic acid containing 1–4 carbon atoms in the molecule is employed, the esterification being effected at a temperature which reaches at least 50° C. and recovering the cellulose ester upon completion of esterification and neutralization of the catalyst, without requiring any hydrolysis or other action to remove the sulphuric acid from chemical combination with the ester.

2. Process according to claim 1, wherein the pretreatment is effected with acetic acid, and the cellulose is acetylated with acetic anhydride in the presence of at least sufficient acetic acid to dissolve the cellulose acetate formed.

3. Process for the manufacture of a lower aliphatic acid ester of cellulose, which comprises pretreating cellulose by contacting it with a mixture of an aliphatic acid containing 1–4 carbon atoms in the molecule and sulphuric acid thereby to distribute throughout the cellulose not more than 1% of its weight of sulphuric acid, and then catalytically esterifying the pretreated cellulose with the anhydride of an aliphatic acid containing 2–4 carbon atoms in the molecule in the presence of sufficient of such aliphatic acid to dissolve the cellulose ester as it is formed, and the catalyst consisting of the sulphuric acid remaining from the pretreatment, the esterification being effected at a temperature which reaches at least 50° C. and recovering the cellulose ester upon completion of esterification and neutralization of the catalyst, without requiring any hydrolysis or other action to remove the sulphuric acid from chemical combination with the ester.

4. Process for the manufacture of cellulose acetate which comprises pretreating cellulose with acetic acid and sulphuric acid thereby to distribute throughout the cellulose at most 1% of its weight of sulphuric acid, and then acetylating the cellulose with acetic anhydride in the presence of sufficient acetic acid to dissolve the cellulose acetate formed and using the sulphuric acid remaining from the pretreatment as the sole catalyst, the acetylation being effected at a temperature which reaches at least 60° C. and recovering the cellulose ester upon completion of esterification and neutralization of the catalyst, without requiring any hydrolysis or other action to remove the sulphuric acid from chemical combination with the ester.

5. Process according to claim 4, wherein the cellulose acetate produced is precipitated from the solution in which it is formed without being subjected to any substantial degree of hydrolysis and has an acetyl value, calculated as acetic acid, between 61 and 62.5%.

6. Process according to claim 5, wherein the amount of sulphuric acid present during the acetylation is 0.02–0.75% of the dry weight of the cellulose and the acetylation is effected at a temperature which reaches a maximum between 60° C. and the boiling point of acetic acid.

References Cited in the file of this patent

UNITED STATES PATENTS

| 2,261,237 | Dreyfus | Nov. 4, 1941 |
| 2,345,406 | Malm | Mar. 28, 1944 |
| 2,487,892 | Richter et al. | Nov. 15, 1949 |
| 2,622,080 | Richter et al. | Dec. 16, 1952 |
| 2,627,515 | White et al. | Feb. 3, 1953 |